United States Patent [19]

Nelson

[11] Patent Number: 4,901,676
[45] Date of Patent: Feb. 20, 1990

[54] SEALING AND INSULATION DEVICE FOR THE SPACE BETWEEN SPACED APART SURFACES

[75] Inventor: Thomas E. Nelson, Anchorage, Ky.

[73] Assignee: Soltech, Inc., Shelbyville, Ky.

[21] Appl. No.: 295,554

[22] Filed: Jan. 11, 1989

Related U.S. Application Data

[63] Continuation-in-part of Ser. No. 177,439, Apr. 4, 1988.

[51] Int. Cl.$^4$ ............................................... F22B 5/04
[52] U.S. Cl. ........................................ 122/19; 52/406; 220/444; 264/46.5; 425/383
[58] Field of Search .............. 425/383; 264/45.2, 46.5, 264/46.9; 52/406, 743; 428/69, 71; 29/451, 455.1; 122/13 R, 13 A, 114, 119, 19; 220/469, 444

[56] References Cited

U.S. PATENT DOCUMENTS

| | | | |
|---|---|---|---|
| 1,874,659 | 8/1932 | Upson | 52/406 X |
| 2,863,179 | 12/1958 | Gaugler | 52/406 |
| 3,264,165 | 8/1966 | Stickel | 52/406 X |
| 3,307,318 | 3/1967 | Bauman | 52/743 |
| 3,546,846 | 12/1970 | Sens | 52/406 X |
| 3,729,879 | 5/1973 | Franklin | 52/406 X |
| 3,921,273 | 11/1975 | Kondo et al. | 29/451 X |
| 4,172,915 | 10/1979 | Sheptak et al. | 52/406 X |
| 4,372,028 | 2/1983 | Clark et al. | 29/460 |
| 4,399,645 | 8/1983 | Murphy et al. | 52/743 |
| 4,447,377 | 5/1984 | Denton | 264/45.2 |
| 4,477,399 | 10/1984 | Tilton | 264/45.2 |
| 4,657,798 | 4/1987 | Guilhem | 52/406 X |
| 4,736,509 | 4/1988 | Nelson | 29/451 |
| 4,749,532 | 6/1988 | Pfeffer | 264/46.5 |

*Primary Examiner*—Richard L. Chiesa
*Attorney, Agent, or Firm*—Woodward, Emhardt, Naughton Moriarty & McNett

[57] ABSTRACT

A sealing and insulation device for the space between spaced apart surfaces having an envelope fabricated of a resilient, flexible material filled with a resilient insulation material. The sealing and insulation device has a width dimension at least as great as the distance across the space between the surfaces to be sealed. By removing air from the interior of the sealing and insulation device the width dimension of the device is reduced to less than the transverse dimension of the space to be sealed. Once the shrunk device is positioned, air is allowed back into the sealing and insulation device enabling the device to resiliently turn back towards its original width dimension such that the sealing and insulation device expands into abutting contact with both spaced apart surfaces across the space therebetween. The purpose of the device being both to seal and insulate in thermal applications such as a water heater and acoustical applications such as dishwasher. In the thermal application such as the water heater it is sealing the flow of a liquid foaming agent and then insulating by impeding thermal transfer. In the acoustical application it is sealing an opening to prevent direct transmission of sound waves through an opening and insulating by absorbing sound waves generated by the appliance.

18 Claims, 5 Drawing Sheets

SEALING AND INSULATION DEVICE FOR THE SPACE BETWEEN SPACED APART SURFACES

CROSS REFERENCE TO RELATED APPLICATIONS

This application is a continuation-in-part application of my prior, co-pending application, Ser. No. 177,439 filed Apr. 4, 1988.

BACKGROUND OF THE INVENTION

The invention relates to sealing and insulating devices, and more particularly to methods of installing sealing and insulating devices in a space which is no larger in transverse dimension than the thickness of the insulation device.

The present invention has numerous practical applications for sealing and insulating between spaced apart surfaces. For example, when insulating the space between spaced apart surfaces, it is often desirable to have the insulation completely fill the transverse distance between the two surfaces thereby avoiding voids between the insulation and surfaces. It is however, difficult to install insulation within a space which is no larger in transverse dimension than the thickness dimension of the insulation which is to be installed therein.

As another example, to insulate a space between spaced apart surfaces, it is desirable to use a foam insulation material. Typically, the foam insulation material is injected in liquid form into the space between the surfaces, and allowed to foam in situ to fill the space. It is however, difficult to seal the space to confine the foaming insulation material and prevent the foaming insulation material from leaking out of the space to be insulated.

The invention finds particular utility in insulating and sealing between prefabricated panels with spaced apart sides, and which are compact in physical size with relatively small spaces therebetween to be insulated. For example, the invention can be used in the insulation of automobile components such as doors or trunk lids and construction products such as windows and doors, and home appliances such as refrigerators, water heaters and dishwashers.

As one example, U.S. Pat. No. 4,399,645 issued Aug. 23, 1983 to Murphy et al. describes a bladder which may be installed in the side wall of a structure, such as between studs, and inflated after being installed. By inflating the otherwise collapsed bladder, it is forced into contact with the enclosing walls or sides of the structure space and may thereafter be filled with insulation. Also disclosed is the use of adhesive to securely bond the bladder to the defining walls (sides) of the space where it is installed. Removal of the air within the insulation-filled bladder is accomplished by injecting a gaseous medium such as carbon dioxide. Instead of using pressure in the bladder, a vacuum may be utilized. This reference also mentions concerns over off-gas generation. In contrast, the present invention draws a vacuum on the envelope after it is filled with insulation so as to resiliently compress it and its contents to a significantly smaller size for installation. The vacuum is released after installation where in Murphy the vacuum is applied after installation. The present invention necessitates resilient, flexible materials for both the envelope and the filler insulation while Murphy does not.

As another example, the typical water heater device is constructed of an inner water tank with an outer shell located concentrically over the inner tank and defining an annular space therebetween. A cap closes the top end and a floor closes the bottom end of the water heater device. The annular space between the inner tank and outer shell is filled with a thermal insulation. For many years fiberglass mats or batts have been used as the insulation material between the inner tank and outer shell. Preferably, these mats should be of a thickness or radial width at least equal to the radial width of the space between the inner tank and the outer shell to provide optimum insulation results. However, this desired fit presents a problem when assembling the outer shell concentrically over the inner tank because the mat then physically interferes with the movement of the outer shell over the inner tank.

More recently a foam such as urethane, has been used as the thermal insulation material in place of fiberglass between the inner tank and outer shell. Typically a foam material is injected into the annular space between the inner tank and outer shell, and is allowed to foam in situ. However, there is a problem in restraining the expanding foam within the annular space and more particularly within a predetermined location or region within the annular space.

The following U.S. Patents illustrate various prior art attempts to insulate water heaters.

U.S. Pat. No. 4,372,028 issued on Feb. 8, 1983 to Clark et al. shows a water heater having a foam-filled closed bag (collar) located in the annular space between the inner tank and outer shell at the bottom of the inner tank, with the annular space above the annular bag filled with expanded foam. The collar functions as a stop to the expanded foam in the annular space thereabove. In the manufacture of the water heater a flexible, expandable closed elongated bag having a hole therein is filled with a foam material which expands the bag, and before the foam material has had sufficient time to fully expand, the bag opening is sealed and the bag is circumferentially wrapped around the lower end of the tank with the bag ends overlapping each other. Then, still before the foam material in the bag has had sufficient time to expand, the outer shell is positioned over the inner tank and bag. The foam in the bag expands to be in compression between the inner tank and outer shell. The annular space above the collar is then filled with expandable foam material.

U.S. Pat. No. 4,447,377 issued on May 8, 1977 to Denton shows a gas fired water heater wherein a layer of fiberglass batt insulation material is wrapped around the bottom portion of the inner water tank around the combustion chamber and a plastic envelope is wrapped around the inner tank above the fiberglass insulation. The envelope is in the form of an elongated thin tube having an inner wall, an outer wall, a bottom wall, two end walls and an open top. When wrapped around the inner tank, the end walls of the envelope abut each other. The outer shell is positioned over the inner tank such that the envelope is in the annular space therebetween. Expandable foam is injected through the open envelope top into the envelope and allowed to expand therein. The fiberglass batt does not form a seal between itself and the inner water tank and the outer shell.

U.S. Pat. No. 4,477,399 issued on Oct. 16, 1984 to Tilton shows a water heater having an inflatable toroidally shaped tube located around the bottom end of the inner tank such that when the toroidal tube is inflated with air, it seals the bottom end of the annular space between the inner tank and outer shell. A foamable material is then injected into the annular space above the toroidal tube to fill the annular space.

U.S. Pat. No. 4,749,532 issued June 7, 1988 to Pfeffer discloses a method of wedging a band of insulation around the tank as a barrier to liquid foam. The arrangement uses a "shoe horn" to compress inwardly the outer edges of the fiberglass belt so that the shell can be lowered into position without interference.

Each of the above discussed known water heater constructions present numerous problems in manufacture such as, for example, a large number of steps, critically timed steps, and time consuming steps which add to the cost and present potentials for defects in the final product.

U.S. Pat. No. 4,736,509 issued Apr. 12, 1988 to Nelson discloses a method of sealing the lower portion of the annular space between the tank and shell. This arrangement offers a number of improvements to water heater construction since a sealing cuff is somewhat "automatically" formed as the shell is lowered into position. There are a number of time and quality benefits, but the concept is generally limited to water heaters.

As a further example of an application for the present invention, home automatic dishwashing machines are typically installed in a confined space in kitchen cabinetwork beneath the counter top. In order to reduce noise transmission generated by the mechanism of the dishwasher machine it would be advantageous to install an acoustical insulation between the dishwasher and cabinetwork. This insulation should totally fill the space between the dishwasher and the cabinet to seal what would otherwise be a direct transmission path to the kitchen environment. However, the space between the dishwasher machine and cabinetwork is so tight that to date it is a virtual impossibility to do so.

SUMMARY OF THE INVENTION

The present invention provides a sealing and insulation device for use between two spaced apart surfaces wherein the sealing and insulation device includes an envelope fabricated of a resilient, flexible, gas-impermeable material arranged so as to define a closed and evacuated interior cavity, the evacuated condition is achieved by pulling a vacuum and a mass of flexible, resilient insulation material is disposed in the interior cavity and shrunk to a below-normal size. The sealing and insulation device being sized to fit in the space between the two spaced apart surfaces in abutment with each of the two surfaces across the space therebetween once the vacuum is released and the sealing and insulation device returns toward its normal size.

One object of the present invention is to provide an improved sealing and insulation device.

Related objects and advantages of the present invention will be apparent from the following description.

DESCRIPTION OF THE PREFERRED EMBODIMENT

Figure 1:
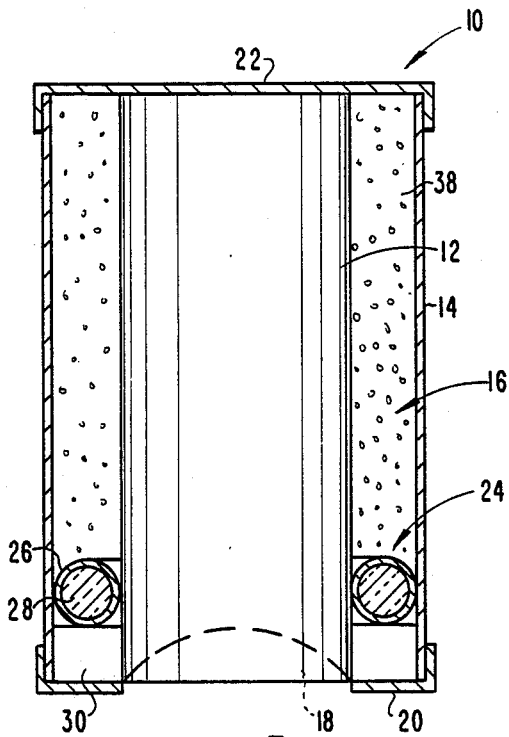
FIG. 1 is a schematic representation, in cross-sectional view, of a water heater device with a sealing and insulating device therein placed.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention has utility in the manufacture of any number of various products. However, for the sake of clarity and clearness of understanding, but in no way limiting, the present invention will be described in conjunction with the manufacture of a hot water heater device (see FIGS. 1-5 and FIGS. 6-9), a dishwasher installation (see FIGS. 10-11), and the manufacture of a refrigerator (see FIGS. 12-14).

FIG. 1 schematically illustrates a conventional type water heater device, generally denoted as the numeral 10, having an inner water tank 12 for containing water and an outer shell 14 concentrically surrounding the inner water tank 12. The outer shell 14 and inner water tank 12 cooperate to define an annular space 16 therebetween. As shown, the water heater device 10 is of the gas-fired type having a combustion chamber 18 located at the bottom end of the inner water tank 12. A combustion device or gas burner (not shown) is located within the combustion chamber 18. The bottom of the annular space 16 can be closed by a bottom wall 20, and the top of the water heater device 10 is closed by a top wall 22.

With continued reference to FIG. 1 and additional reference to FIGS. 2–5, a sealing and insulation device 24 is positioned within the annular space 16 in abutting contact with the first or exterior surface of the water tank 12 and the second or interior surface of outer shell 14. The sealing and insulation device 24 is shown in FIGS. 2–5 as comprising a closed, elongated envelope 26 fabricated of a resilient, flexible, gas-impermeable material. A suitable material for the envelope includes as one option a thermoplastic film such as polyethylene film, or polypropylene film. Another option is a laminate of aluminum foil and polyethylene film. The closed envelope 26 is filled with a mass of resilient insulation material 28 such as interengaged or non-interengaged fibrous material, for example, fiberglass, mineral wool, cellulose, ceramic fiber, or divided, discrete particles of material, for example, beads of plastic foam, or a resilient flexible foam, for example, a flexible urethane foam, and the like. The specific insulation material used will be a function of the end use and environment. The length of the envelope 26 of the insulation device 24 is sufficient to circumscribe the annular space 16 with the ends of the envelope 26 in mutual end-to-end or overlapping abutment. The thickness or width dimension of the envelope 26 is at least equal to the transverse dimension of the space 16 so as to be in abutting contact with both the exterior surface of the water tank 12 and interior surface of the outer shell 14 across the space 16. Envelope 26 has a substantially circular lateral cross section throughout its length.

Figure 2:
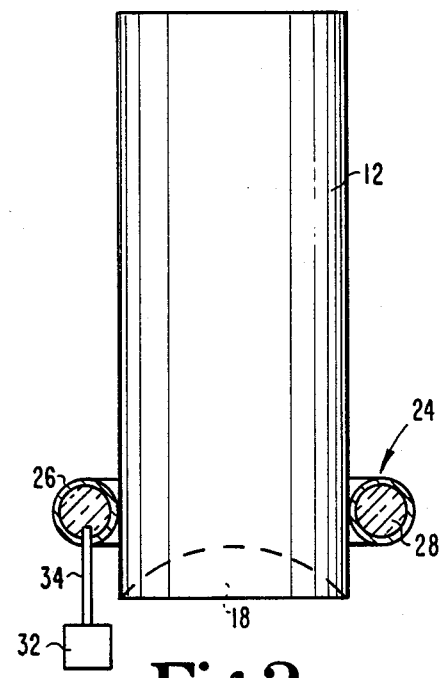
FIG. 2 is a schematic representation, in cross-sectional side view, of a step in the novel process of the invention.
Figure 3:
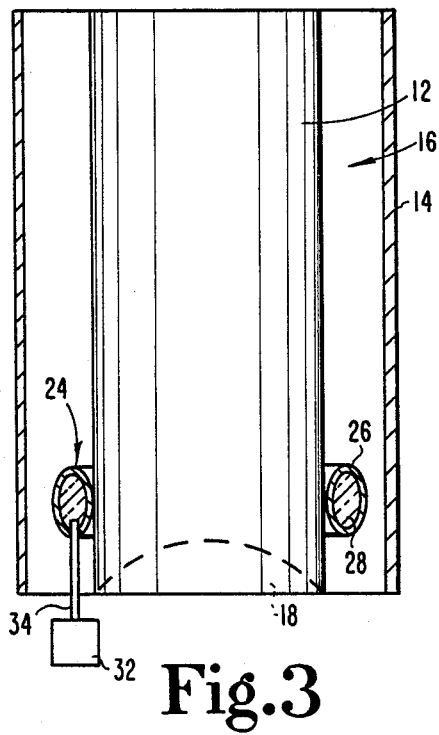
FIG. 3 is a schematic representation in cross-sectional side view, of another step in the novel process of the invention.
Figure 4:
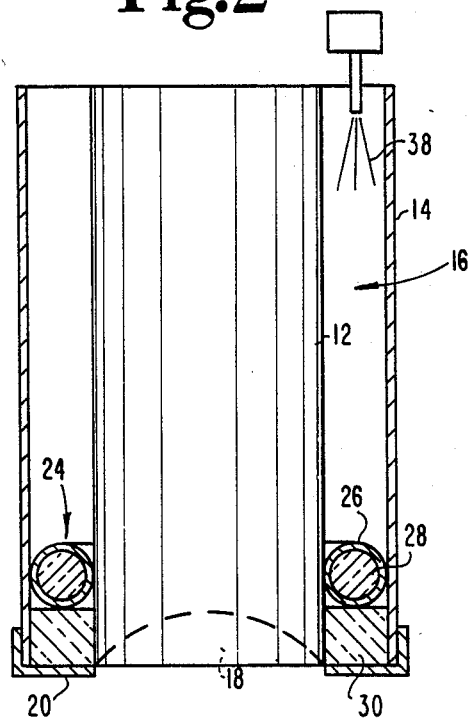
FIG. 4 is a schematic representation in cross-sectional side view, of yet another step in the novel process of the invention.
Figure 6:
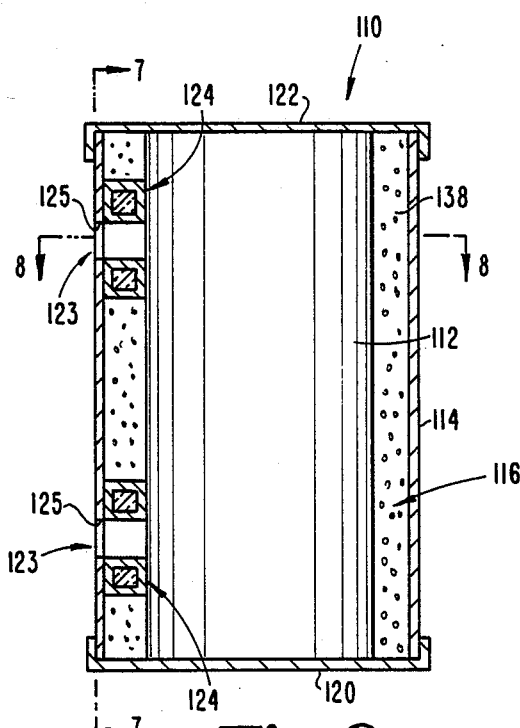
FIG. 6 is a schematic representation, in cross-sectional view, of another water heater device with a sealing and insulation device therein.
Figure 5:
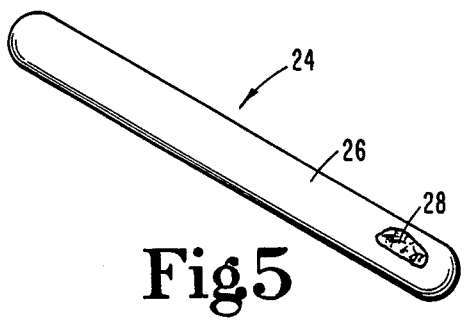
FIG. 5 is a schematic perspective representation of the sealing and insulating device of the water heater device of FIG. 1.
Figure 8:
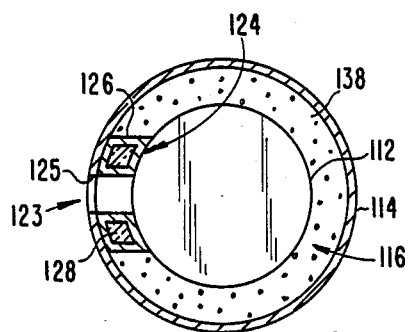
FIG. 8 is a transverse cross-sectional view of the water heater device as seen in the direction or arrows 8—8 in FIG. 6.
Figure 7:
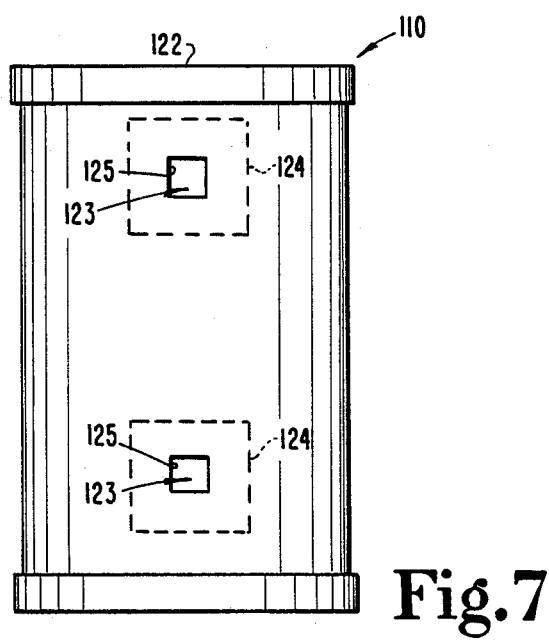
FIG. 7 is a schematic representation of the water heater of FIG. 6 in elevation.

Now with reference to FIGS. 2–4, in the assembly of the water heater 10, the sealing and insulation device 24 is positioned on the first surface or exterior surface of the inner water tank at a preselected location thereon. For example, as shown, the sealing and insulation device 24 is wrapped around the circumference of the inner water tank 12 at a location just above the combustion chamber 18. The circumscribed envelope 26 is fastened to the exterior surface of the water tank 12 to prevent it from moving. This can be done using for example an adhesive or tape. If the sealing and insulation device 24 is located above the combustion chamber 18, a mat of insulation material 30 of fire resistant material should be located within the space 16 below the sealing and insulation device 24 circumscribing the combustion chamber 18.

Next, air is evacuated from the interior of the sealing and insulation device 24 creating a negative pressure within the closed cavity of the envelope. The presence of this negative pressure causes the volume of the insulation material to shrink and thereby reduce the thickness of the sealing and insulation device 24 to a dimension less than the radial width of the annular space 16 between the first or exterior surface of the water tank 12 and second or interior surface of the outer shell 14. The removal of the air can be accomplished by using a vacuum pump 32. The vacuum pump 32 has a flexible hose 34 with, for example, a piercing needle at the free inlet end thereof for piercing the envelope 26 of the sealing and insulation device 24. The free inlet end of the hose 34 is pressed against the sealing and insulation device 24 so that the needle pierces the envelope 26 establishing gas communication between the inlet end of the hose 34 and interior of the envelope 26. When the vacuum pump 32 is activated, air is removed from the interior of the sealing and insulation device 24 which causes the envelope 26 to shrink in width to at least a dimension less than the transverse dimension of the space 16. The outer shell 14 is then positioned coaxially over the inner water tank 12 so that the second or interior surface of the outer shell 14 is in spaced apart relationship to the first or exterior wall surface of the water tank 12. The inlet end of the vacuum pump hose 34 is removed from engagement with the sealing and insulation device 24 allowing ambient air to re-enter the envelope 26 of the sealing and insulation device 24 through the pierced hole and thereby release the vacuum. As the vacuum within the interior cavity is released, the stored energy in the resilient insulation material is released and the insulation begins to return back toward its original size. Since the sealing and insulation device in normal (ambient) condition is larger in thickness than the dimension of the annular space, the device is in abutting contact with both the exterior surface of the water tank 12 and interior surface of the outer shell 14 across the space 16 therebetween circumferentially of the space 16. The volume of annular space 16 above the abutting sealing and insulation device 24 is filled with an expanded foam insulation material 38 such as urethane, polyethylene, polystyrene and the like. Expandable foam insulation material is injected or otherwise placed in the annular space 16 above the sealing and insulation device 24, and allowed to expand in situ filling the annular space 16 above the insulation device 24. The abutting contact of the sealing and insulation device 24 with the exterior surface of the water tank 12 and interior surface of the outer shell 14 resists the pressure generated by the expanding foaming material 38 and seals across the space 16 to prevent leakage of the foam material past the sealing and insulation device 24 as it is expanding in the space 16 above the sealing and insulation device 24. Thus, the sealing and insulation device 24 functions to insulate the portion of the space 16 in which it is located and also functions as a seal or stop to the expanding foam material 38 from leaking past the sealing and insulation device 24.

It is contemplated that the sealing and insulation device 24 could be positioned on the interior surface of the outer shell 14, evacuated of air, then have the water tank 12 positioned coaxially within the outer shell 14 in spaced apart relationship to define the space 16. Air is then allowed to re-enter the envelope 26 of the sealing and insulation device 24 (release of the vacuum) and the sealing and insulation device 24 returns back toward its original size such that it expands into contact with both the exterior surface of the tank 12 and interior surface of the shell 14.

It is further contemplated that an alternative sequence of steps to those discussed above can also be followed. With reference to FIG. 1, the outer shell 14 can be positioned coaxially over the inner water tank 12 so that the second or interior surface of the outer shell 14 is in spaced apart relationship to the first or exterior wall surface of the water tank 12. Air is then evacuated from the interior of the sealing and insulation device 24 which causes the envelope 26 to shrink in at least the width dimension to a dimension less than the transverse dimension of the space 16. The removal of air (pulling a vacuum) can be accomplished by, for example, using the vacuum pump 32 as described above. The sealing and insulation device 24 is then positioned in the space 16, and when in position the hose is removed from engagement with the sealing and insulation device 24 allowing ambient air to re-enter the envelope 26 through the pierced hole. As the vacuum is released by the entry of ambient air the sealing and insulation device returns toward its normal (ambient) size such that it expands into abutting contact with both the first or exterior surface of the water tank 12 and second or interior surface of the outer shell 14 across the space 16 therebetween. The expandable foam insulation material 38 is then introduced into the volume of annular space 16 above device 24 and allowed to expand in situ. In the above-described sequence of steps, it is contemplated that after the air has been evacuated from the sealing and insulation device 24, the hose is removed from engagement with the sealing and insulation device 24, and the pieced hole is sealed by for example a strip of tape before the sealing and insulation device 24 is positioned. Then, after the sealing and insulation device 24 is positioned within the space 16, either the tape is removed and ambient air is allowed to enter through the pierced hole into the sealing and insulation device 24. This entry of air which releases the vacuum allows the sealing and insulation device 24 to expand back to its original size such that it is in abutting contact with both the first surface of the water tank 12 and second surface of the outer shell 14 across the space 16 therebetween.

With continued reference to the immediately above-discussed sequence of steps, it is further contemplated that in some situations, it will not be necessary to seal the pierced holes in the sealing and insulation device 24 after the air has been evacuated and the hose removed because the holes are small enough to retard the flow of ambient air into the sealing and insulation device 24 through the holes sufficiently to allow time for the sealing and insulation device 24 to be installed in the space 16 before it fully compressively expands back to its original size. A related approach is to evacuate the interior cavity of device 24 and seal the pierced hole closed. Device 24 may be retained in this condition until ready to be used. Once installed or while being installed a hole is pierced or the pierced hole opened allowing air to enter at a rate such that device 24 slowly expands.

Now with reference to FIGS. 6-9, there is shown an electrically heated water heater, generally denoted as the numeral 110, which includes an inner water tank 112 and an outer shell 114 located concentrically over the inner tank 112 with a uniformly wide annular space 116 therebetween. The bottom of the water heater 110 is closed by a bottom wall 120 and the top of the water heater 110 is closed by a top wall 122. The water heater 110 also includes a control apparatus 123 at the exterior wall surface of the water tank 112. The control apparatus 123 includes, for example, heating elements which project into the inner water tank 112 to heat the water contained therein and thermostatic controls for adjusting the heat generated by the heating elements. Usually, two such control apparatus are utilized at different elevations of the inner tank 112. Access to the control apparatus 123 from the exterior of the water heater 110 is provided for by access apertures 125 formed through the side wall of the outer shell 114 in alignment with the control apparatus 123 and thus the control apparatus 123 is exposed to the exterior of the water heater 110.

Figure 9:
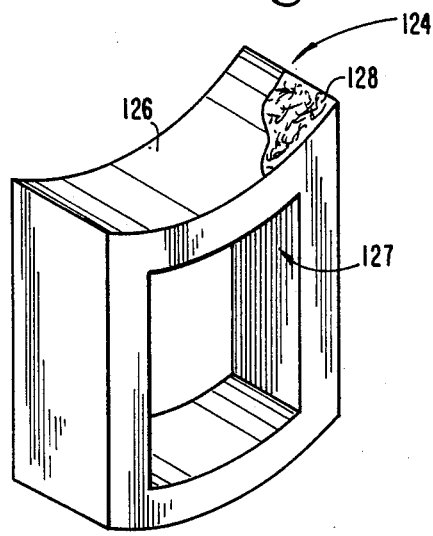
FIG. 9 is a schematic perspective representation of the sealing and insulating device of the water heater device of FIG. 6.

With continued reference to FIGS. 6-9, there is shown a sealing and insulation device, generally denoted as the numeral 124, in the shape of a collar. The sealing and insulation device 124 includes a centrally located collar opening 127. The peripheral configuration of the collar opening 127 matches the peripheral configuration of the access aperture 125. In the embodiment of FIG. 9, the collar opening 127 through the sealing and insulation device 124 receives the control apparatus 123 therethrough. The outer perimeter of the sealing and insulation device 124 is larger than the perimeter of the control access aperture 125 formed through the wall of the outer shell 114. The width or thickness of the sealing and insulation device 124 has a dimension at least equal to the width of the annular space 116 between the exterior surface of the water tank 112 and the interior surface of the outer shell 114.

The sealing and insulation device 124 is shown as comprising a closed, envelope 126 fabricated of a resilient, flexible, gas-impermeable material. The envelope material can be, for example, a thermoplastic film such as polyethylene film, or polypropylene film. Alternatively, the envelope material can be a laminate of aluminum foil and polyethylene film. The closed envelope 126 is filled with a mass of a resilient, flexible insulation material 128 such as interengaged or non-interengaged fibrous material, for example, fiberglass, mineral wool, cellulose, ceramic fiber, or divided, discrete particles of material, for example, beads of plastic foam, or resilient, flexible foam, for example, a flexible urethane foam, and the like. By a proper selection of material a 2-inch or 3-inch normal thickness can be shrunk to at least ½ inch when the vacuum is pulled on the envelope cavity.

In the assembly of the water heater 110, the sealing and insulation device 124 is positioned about the perimeter of the control apparatus 123 with the control apparatus 123 projecting into the central opening 127 thereof, and with the back side of the sealing and insulation device 124 in abutment with the first surface or exterior surface of the inner water tank 112. The sealing and insulation device 124 can be attached to the inner water tank 112 by a adhesive or tape if required to prevent it from moving. Next, air is evacuated from the interior of the sealing and insulation device 124 to shrink it and reduce the thickness or width dimension of the sealing and insulation device 124 to a dimension less than the width of the space 116. The removal of the air can be accomplished in the same manner as discussed above in the removal of air from the insulation device 24. The outer shell 114 is then positioned coaxially over the inner water tank 112 so that the second or interior surface of the outer shell 114 is in spaced apart relationship to the first or exterior wall surface of the water tank 112, such that the access apertures 125 in the outer shell 114 are in registration with the central openings 127 of the sealing and insulation device 124. This alignment applies to the control apparatus 123 so that the control apparatus 123 will be accessible from the outside of the water heater 110.

The inlet end of the hose 34 is removed from engagement with the sealing and insulation device 124 allowing ambient air to re-enter the envelope 126 through the pierced openings made therein to allow the sealing and insulation device 124 to expand back toward its original size such that it expands into abutting contact with both the exterior surface of the water tank 112 and interior surface of the outer shell 114 across the space 116 therebetween. Expandable foam 138 is injected into the volume of space 116 around devices 124 and is allowed to expand in situ filling the space 116 surrounding the sealing and insulation devices 124. The sealing and insulating devices 124 function to insulate the space 116 around the control apparatus 123 and, due to its abutting contact with the surfaces of the inner tank 12 and outer shell 14, also functions as a seal or stop to the expanding foam preventing the expanding foam from leaking past the insulation devices 124 and covering the control apparata 123.

In the above-described sequence of steps, it is alternatively contemplated that after the air has been evacuated from the sealing and insulation device 124, the hose 34 is removed from engagement with the sealing and insulation device 124, and the pierced hole is sealed by, for example, a strip of tape before the sealing and insulation device 124 is positioned. Then, after the sealing and insulation device 124 is positioned within the space 116, the tape is removed and ambient air is allowed to enter through the pierced hole into the sealing and insulation device 124. This entry of air releases the vacuum and allows the sealing and insulation device 124 to expand back to its original size such that it is in abutting contact with both the first surface of the water tank 112 and the second surface of the outer shell 114 across the space 116 therebetween.

With continued reference to the immediately above-discussed sequence of steps, it is further alternatively contemplated that in some situations it will not be necessary to seal the pierced holes in the sealing and insulation device 124 after the air has been evacuated and the hose removed because the pierced holes are small enough to restrict the flow of ambient air into the sealing and insulation device 124 through the holes sufficiently to allow enough time for the sealing and insulation device 124 to be installed in the space 116 before it fully expands back to its original size.

Further, in the event that it is desired to make sure that the expanding foam material 38 will not leak past the interface of the floor 120 with the inner water tank 112 and with the outer shell 114 of the water heater 110, it is contemplated that the sealing and insulation device 24 described in conjunction with the gas-heated or fired water heater 10 can be used with the electrically heater water heater 110. In this event, the sealing and insulation device 24 can be located circumferentially within the annular space 116 adjacent the bottom wall or floor 120 of the water heater 110. The process for installing the insulation device 24 in the water heater 10 discussed above, is followed for installing the sealing and insulation device 24 in the water heater 110.

Figure 10:
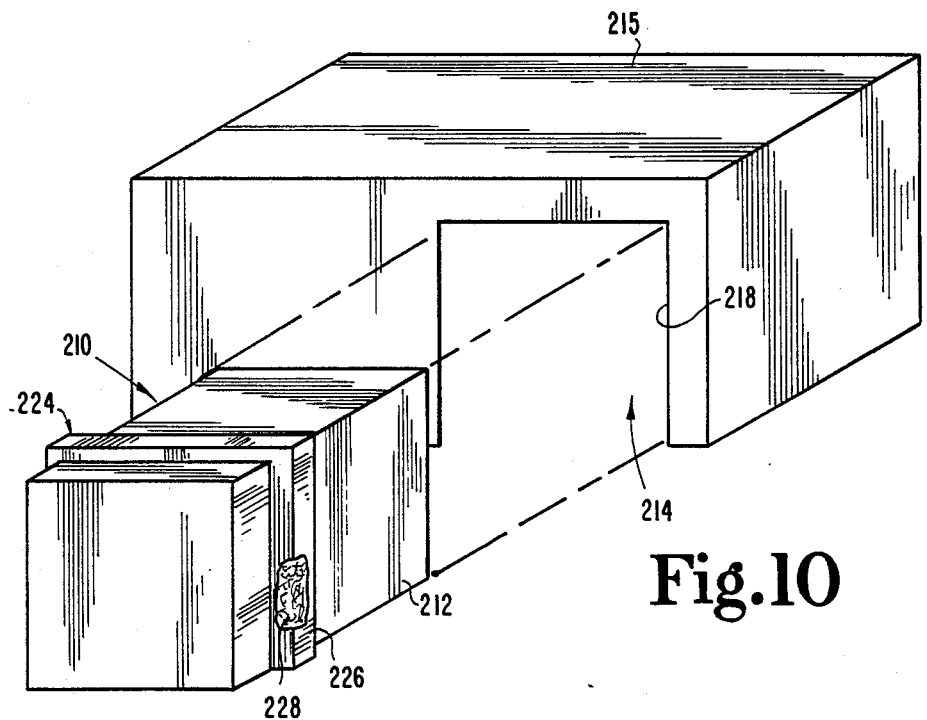
FIG. 10 is an exploded perspective schematic representation of an installation of a dishwasher appliance incorporating a sealing and insulating device.
Figure 11:
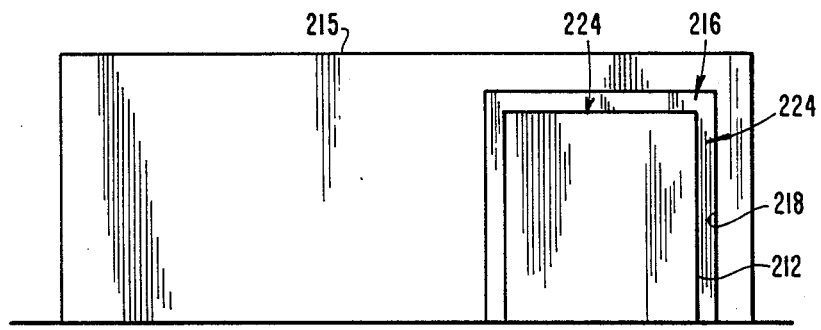
FIG. 11 is a front view of the dishwasher appliance of FIG. 10 installed in a confined space in a kitchen cabinetwork.

Now with reference to FIGS. 10 and 11, there is shown a dishwasher apparatus 210 having a housing 212 which is to be installed within the confines of an opening 214 formed in a kitchen cabinetwork 215. The exterior surface of the dishwasher housing 212 can be considered a first surface of two spaced apart surfaces, and th edge 218 of the opening 214 can be considered to be a second surface of two spaced apart surfaces.

A sealing and insulation device 224 is shown as comprising a closed elongated envelope 226 fabricated of a resilient, flexible, gas-impermeable material. The material can be, for example, a thermoplastic film such as polyethylene film, or polypropylene film. Alternatively, the envelope material may be a laminate of aluminum foil and polyethylene film. The closed envelope 226 is filled with a resilient, flexible insulation material 228 such as interengaged or non-interengaged fibrous material, for example, fiberglass, mineral wool, cellulose, ceramic fiber, or divided, discrete particles of material, for example, beads of plastic foam, or resilient, flexible foam such as a flexible urethane foam, and the like. The specific insulation material used will be a function of the end use and environment. The length of the envelope 226 of the sealing and insulating device 224 is sufficient to overlay the two sides and top side of the dishwasher housing 212. The thickness or width dimension of the envelope 226 is at least equal to the transverse dimension of the space 216 between the first or exterior surface of the dishwasher housing 212 and the second or edge 218 of the opening 214 so as to be in abutting contact with both the first and second surfaces across the space 216. The width dimension of the sealing and insulation device can be increased up to a width that would entirely cover the housing 212 if desired to give maximum coverage for noise absorption purposes. While envelope 226 may begin as a substantially straight, elongated tube with a generally circular lateral cross section, the envelope may also be configured as a three-sided member formed with relatively flat sides and sharp corners to more readily and tightly fit around square or rectangular peripheries. To enhance the fit and sealing when such a three-sided frame envelope is selected, it is configured with a generally rectangular lateral cross section throughout its length. Each side or length of the frame has four substantially flat surfaces which are substantially parallel and perpendicular as would be expected to create the described lateral cross section.

With continued reference to FIGS. 10 and 11, the sealing and insulation device 224 is positioned on the exterior surface of the dishwasher housing 212 overlaying the two sides and top side of the housing 212. The sealing and insulation device 224 can be attached to the dishwasher housing 212 by, for example, an adhesive, or tape if required to prevent it from moving. Next, a vacuum is pulled on the interior of the sealing and insulation device 224 to shrink it and reduce the thickness or with dimension of the sealing and insulation device 224 to a dimension less than the width of the space 216. The removal of air can be accomplished in the same manner as discussed above in the removal of air from the sealing and insulation device 24 and 124. The dishwasher apparatus 210 is then positioned within the opening 214 of the cabinetwork 215. The inlet end of the hose 34 is removed from engagement with the sealing and insulation device 224 allowing ambient air to re-enter the envelope 226 through the pierced openings made therein. This entry of air releases the vacuum and causes the resilient insulation material to return toward its normal or ambient size. In turn, the sealing and insulation device 224 returns toward its original size such that it is disposed in abutting contact with both the exterior surface of the dishwasher apparatus housing 212 and the edge 218 of the cabinetwork opening 214 across the space 216 therebetween. Once in place, the device completely fills space 216 thus preventing the direct transmission of sound waves into the kitchen environment. It also serves to acoustically insulate by absorbing sound waves generated by the dishwasher.

In the above-described sequence of steps, it is alternatively contemplated that after the air has been evacuated from the sealing and insulation device 224, the hose 34 is removed from engagement with the sealing and insulation device 224, and the pierced hole is sealed by, for example, a strip of tape before the dishwasher apparatus 210 is positioned within the cabinetwork opening 214. Then after the dishwasher apparatus 210 is positioned, the tape is removed and ambient air is allowed to enter through the pierced hole into the sealing and insulation device 224, or the hose is reconnected to the sealing and insulating device 224. This entry of air which releases the vacuum allows the insulation device 224 to expand back to its original size such that it is in abutting contact with both the exterior surface of the dishwasher housing 212 and the edge 218 of the cabinetwork opening 214 across the space 216.

With continued reference to the immediately above-discussed sequence of steps, it is further alternatively contemplated that in some situations it will not be necessary to seal the pierced holes in the sealing and insulation device 224 after the air has been evacuated and the hose 34 removed because the pierced holes are small enough to retard the flow of ambient air into the sealing and insulation device 224 through the holes sufficiently to allow time for the dishwasher apparatus 210 to be installed in the cabinetwork opening before it fully expands back to its original size.

Figure 12:
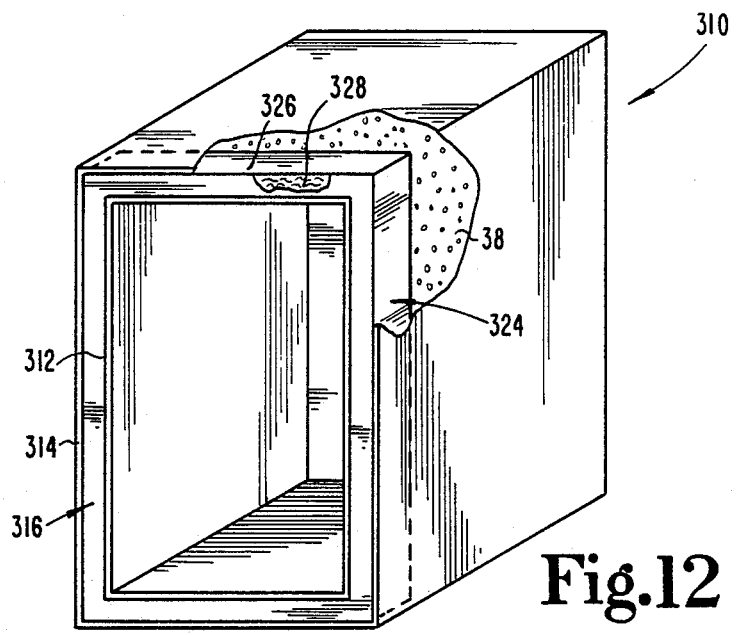
FIG. 12 is a perspective schematic representation, with portions cut away to show internal details, of the housing of a refrigerator appliance incorporating a sealing and insulating device according to the present invention.

Turning now to FIG. 12, there is shown a refrigerator appliance housing 310 having an inner liner having a wall 312 and an outer case having a wall 314 surrounding the liner wall 312 and cooperating to define a space 316 therebetween.

A sealing and insulation device 324 is shown comprising a closed envelope 326 fabricated of a resilient, gas-impermeable material such as a thermoplastic film, for example, a polyethylene film or polypropylene film. Alternatively, the envelope material may be of a laminate foil and polyethylene film. The closed envelope 326 is filled with a resilient, flexible insulation material 328 such as interengaged or non-interengaged fibrous material, for example, fiberglass, mineral wool, cellulose, ceramic fiber, or divided discrete particles of material, for example, beads of plastic foam, or resilient, flexible foam such as a flexible urethane foam, and the like. The length of the envelope 326 of the sealing and insulation device 324 is sufficient to circumferentially fit within the space 316 between the inner lining wall 312 and outer case wall 314 at the entrance to the opening 316. The thickness or width dimension of the envelope 326 is at least equal to the transverse dimension of the space 316 between the first or inner liner wall surface 312 and the second or case wall surface 314 so as to be in abutting contact with both the first and second surfaces across the space 316.

With continued reference to FIG. 12, the air is evacuated from the interior of the sealing and insulation device 324 to shrink it and reduce the thickness or width dimension to less than the width of th space 316. The removal of air can be accomplished in the same manner as discussed above in the removal of air from the sealing and insulation devices 24, 124 and 224.

The reduced size sealing and insulation device 324 is then positioned within the space 316. The inlet end of the hose 34 is removed from engagement with the sealing and insulation device 324 allowing ambient air to re-enter the envelope 326 through the pierced openings made therein to release the vacuum and return the sealing and insulation device 324 back toward its original size such that it is in abutting contact with both the inner liner wall surface 312 and the case wall surface 314 across the space 316 therebetween.

In the above-discussed sequence of steps, it is alternatively contemplated that after the air has been evacuated from the sealing and insulation device 324, the hose 34 is removed from engagement with the sealing and insulation device 324, and the pierced hole is sealed by, for example a strip of tape before the sealing and insulation device 324 is positioned into the space 316. Then after the sealing and insulation device 324 is positioned in the space 316, the tape is removed and ambient air is allowed to enter through the pierced hole into the sealing and insulation device 324. This entry of air releases the vacuum and enables the insulation device 324 to expand back to its original size such that it is in abutting contact with both the inner liner wall surface 312 and the outer case wall surface 314 across the space 316.

With continued reference to the immediately above-discussed sequence of steps, it is further alternatively contemplated that in some situations it will not be necessary to seal the pierced holes in the sealing and insulation device 324 after the air has been evacuated and the hose 34 removed because the pierced holes are small enough to retard the flow of ambient air into the sealing and insulation device 324 through the holes sufficiently to allow time for the sealing and insulation device 324 to be installed in the space 316 before it fully expands back to its original size.

After the sealing and insulation device 326 is installed in the space 316 and expanded into contact with both the inner liner surface 312 and outer case wall surface 314, the space 316 behind the sealing and insulation device 324 is filled with an expandable foam insulation material 38 such as urethane, polyethylene, polystyrene and the like.

Figure 13:
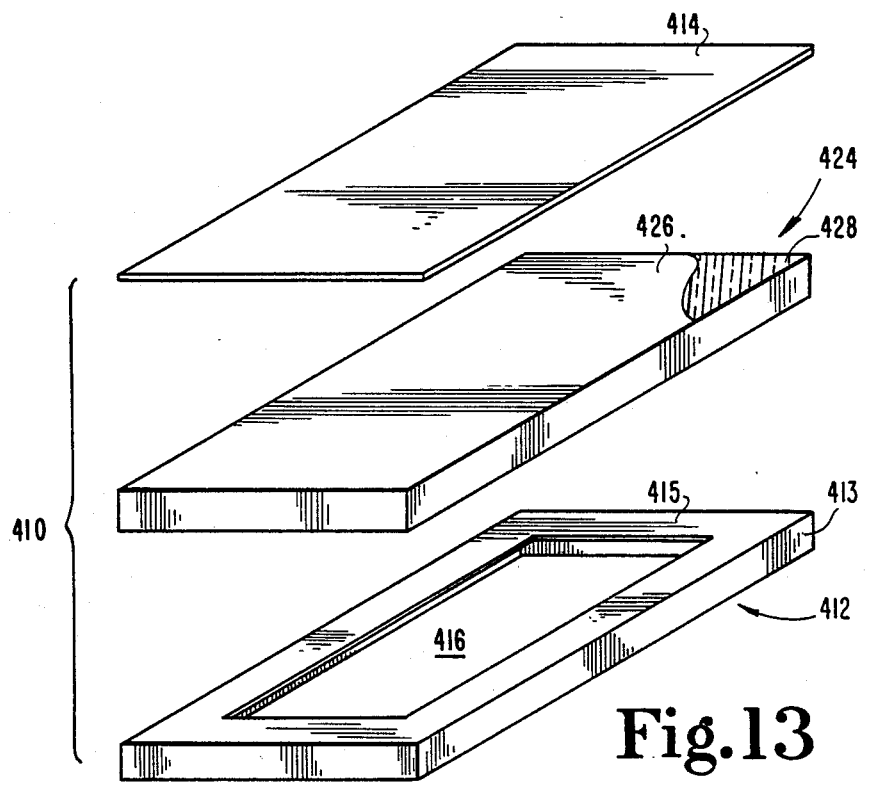
FIG. 13 is a perspective schematic exploded representation, with portions cut away to show internal details, of a door structure, for example, a door of a refrigerator appliance incorporating a sealing and insulation device according to the present invention.
Figure 14:
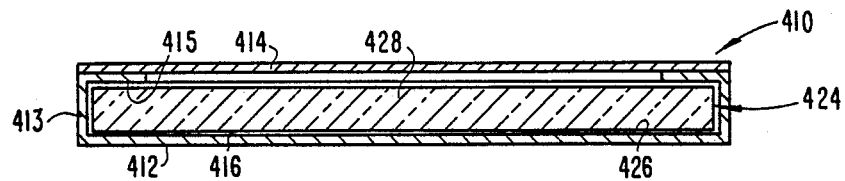
FIG. 14 is a schematic cross-sectional view representation of the assembled door structure of FIG. 13.

Referring now to FIGS. 13 and 14, there is shown a door structure 410 having an exterior door panel 412 and an interior door panel 414. The exterior door panel 412 has a peripheral side wall flange 413 extending at 90 degrees to the exterior door panel 412 and a peripheral mounting flange 415 extending at 90 degrees to the free end of the side wall flange 413 back over and generally parallel to the door panel 412. The interior door panel 414 fits against the mounting flange 415 in registered, parallel, spaced apart relationship to the exterior door panel 412 defining a space 416 therebetween.

A sealing and insulation device 424 is shown as comprising a closed generally rectangular envelope 426 fabricated of a resilient, gas-impermeable material. The material can be, for example, a thermoplastic film such as polyethylene film, or polypropylene film. Alternatively, the material for the envelope may be a laminate of aluminum foil and polyethylene film. The closed envelope 426 is filled with a resilient insulation material 428 such as interengaged or non-interengaged fibrous material, for example, fiberglass, mineral wool, cellulose, or discrete particles of material, for example, beads of plastic foam, or resilient, flexible foam, for example, a flexible urethane foam and the like. The length and breadth of the envelope 426 is sufficient to overlay the entire surface of the exterior door panel 412 and has a thickness or width dimension at least equal to the transverse dimension of the space 416 between the exterior door panel 412 and interior door panel 414.

With reference to FIG. 13, air is evacuated from the interior of the sealing and insulation device 424 to shrink it and reduce the thickness to a dimension less than the width of the space 416 and, therefore, less than the height of the peripheral side wall flange 413. The removal of air can be accomplished in the same manner discussed above in the removal of air from the sealing and insulation devices 24, 124, 224 and 324.

The reduced size sealing and insulation device 424 is then positioned in overlaying disposition on the exterior door panel 412 beneath the peripheral mounting flange 415. The inlet end of the hose 34 is removed from engagement with the sealing and insulation device 424 allowing ambient air to be introduced or re-enter the envelope 426 through the pierced openings made therein. This entry of air releases the vacuum and allows the sealing and insulation device 424 to expand back to its original size. The interior door panel 414 is then positioned on the peripheral mounting flange 415 in spaced apart parallel relationship to the exterior door panel 412 and fastened thereto. The sealing and insulation device 424 thus fills the space 416 and is in abutting contact with both the exterior door panel 412 and interior door panel 414 transversely across the space 416.

In the above-discussed sequence of steps, it is alternatively contemplated that after the air has been evacuated from the sealing and insulation device 424, the hose 34 is removed from engagement with the sealing and insulation device 424, and the pierced hole is sealed by, for example, a strip of tape before the sealing and insulation device 424 is positioned on the exterior door panel 412. Then after the sealing and insulation device 424 is positioned on the exterior door panel 412 beneath the peripheral mounting flange 415, the tape is removed and ambient air is allowed to enter through the pierced holes into the sealing and insulation device 424. This entry of air releases the vacuum and allows the insulation device 424 to expand back toward its original size.

With continued reference to the immediately above-discussed sequence of steps, it is further alternatively contemplated that in some situations it will not be necessary to seal the pierced holes in the sealing and insulation device 424 after the air has been evacuated and the hose 34 removed because the pierced holes are small enough to retard the flow of ambient air into the sealing and insulation device 424 through the pierced holes sufficiently to allow time for the sealing and insulation device 424 to be positioned on the exterior door panel 412 before it fully expands back to its original size.

Figure 15:
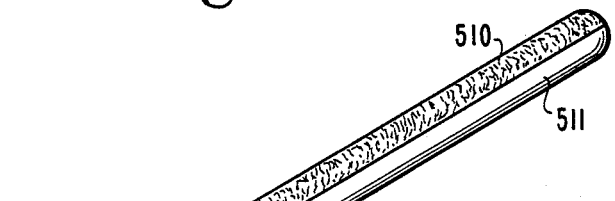
FIG. 15 is a perspective view of a sealing and insulation device with an external layer of insulation according to the present invention.

Referring to FIG. 15 a further feature of the present invention is illustrated. Consider envelope 526 which is virtually identical to envelope 26 (see FIGS. 1 and 5) and its generally uniform, tubular configuration. In a linear orientation the sides are generally parallel to each other. However, when the envelope is wrapped around a cylindrical member such as tank 12, the envelope orients itself into a form with an inside diameter edge or surface and outside diameter edge or surface. Since the length of material is the same for both diameters, the inside diameter may tend to bunch or gather due to an excess of material. This effect could also be seen with other geometries such as going around corners.

Figure 16:
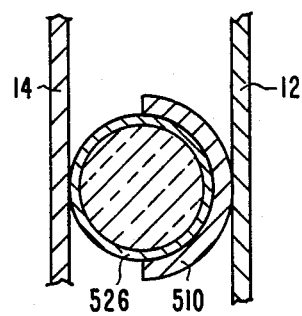
FIG. 16 is a partial, front elevational view in full section of the FIG. 15 device as positioned in a water heater.

In order to insure a complete, integral seal against the outer surface of water tank 12, external insulation layer 510 is applied to a portion of the outer surface 511 of envelope 526. Insulation layer 510 may be a foam material or virtually any flexible, resilient insulation material, such as fiberglass. Any number of adhesive bonding agents may be used to apply layer 510 to the envelope such that it remains where positioned. By arranging the insulation device such that the portion of the envelope which is laminated with the foam layer is disposed against the outer surface of the water tank 12 (see FIG. 16), whatever bunching or gathering of the envelope material may occur, any troughs or channels which would allow leakage of the foam-in-place insulation below the sealing and insulation device, are filled with the external insulation layer. While the external insulation layer 510 is illustrated as being disposed around the inwardly facing surface of envelope 526, this is not a limitation and layer 510 could be disposed at any point around envelope 526 so long as the requisite sealing is achieved.

Figure 17:
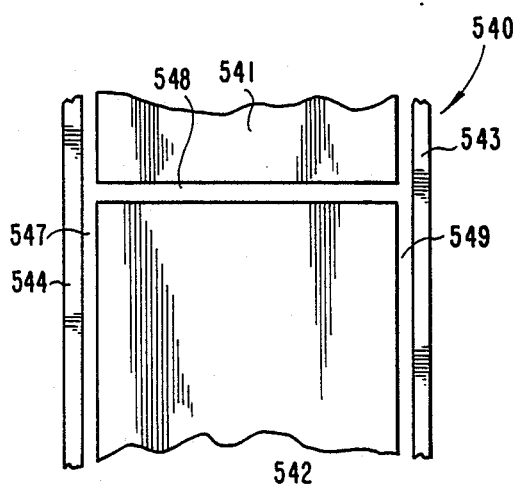
FIG. 17 is a partial, front elevational view of an appliance with spaces to be insulated.
Figure 18:
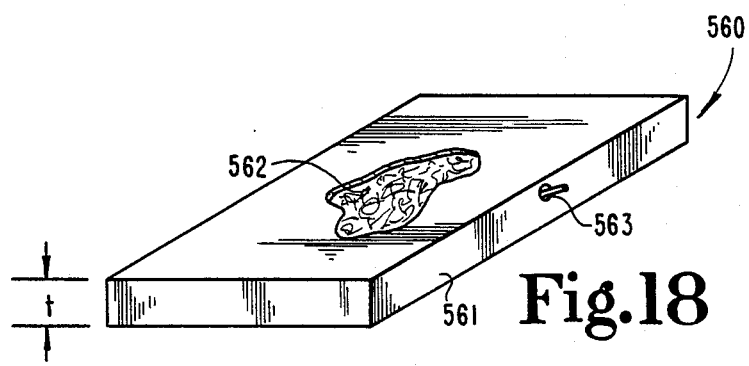
FIG. 18 is a fragmentary, perspective view of a sealing and insulation device for use in insulating the spaces of the FIG. 17 appliance.

Referring to FIG. 17 and 18, a further variation of the present invention is illustrated. In FIG. 17 there is a partial, schematic illustration of an appliance to be insulated, either thermally, acoustically or both. In the FIG. 17 illustration appliance 540 includes a first portion 541 (such as a freezer section), a second portion 542 (such as a refrigerator section) and two side walls 543 and 544. The two portions and two side walls define three spaces 547, 548 and 549 which are to be thermally insulated (or acoustically insulated or both). Each space 547, 548 and 549 is generally shaped as a rectangular volume having six sides or surfaces and while some of these sides or surfaces appear open due to the configuration of FIG. 17, there are enclosing walls or surfaces at some point in the appliance structure.

Assume for example that the thickness of space 548 is one inch between the lower surface of portion 541 and the upper surface of portion 542. According to the foregoing teachings of the present invention a flexible envelope of resilient insulation material can be reduced in thickness by pulling a vacuum and installed into the space and the vacuum released. The starting thickness of the insulation device 560 might be 1½ inches, for example, and reduced to ½ inch. The ½ inch thick device is readily and easily inserted into space 548 and then the vacuum is released. As the device expands back toward its normal or ambient size of 1½ inches, its expansion will be restricted at the approximate one-inch thickness by the spacing between the defining surfaces of portions 541 and 542. Abutment pressure remains due to the resiliency of the device and its "memory" in trying to return to its 1½ inch thickness.

It has been recognized that there is a thickness at which the R-value of fiberglass insulation will exceed the R-value of foam-in-place urethane foam insulation and thus provide the same or better thermal insulating properties without the health concerns and risks of urethane foam. The problem though is that the space to be insulated, such as space 548, has a defined size, in the example, one inch. If the equivalence point is 4 inches of fiberglass mat to one inch of foam-in-place urethane foam then the fiberglass thickness must be reduced. This is an ideal application for the present invention.

Assume now that insulation device 560 begins as a 6-inch thick member (dimension "t") and is structured with a resilient, flexible envelope 561 made of polyethylene film or one of the foregoing mentioned materials for such an envelope. The envelope is filled with a mass of flexible, resilient insulation material 562 which in this specific example is fiberglass. Envelope 561 is configured as a rectangular "solid" with six substantially parallel and perpendicular sides as would be expected for a box-like shape.

Valve stem 563 provides the means to draw a vacuum on the interior of device 560. Under appropriate negative pressure the envelope and insulation collapse and the normal or ambient thickness "t" is reduced to a dimension which is less than the thickness of the space to be insulated, in this example, to a thickness less than one inch. After the device 560 is installed in space 548, the valve stem 563 is opened to let a small amount of air in (i.e., release some of the vacuum). As air enters envelope 561, the fiberglass insulation expands. Air is only allowed to enter until the sides of the envelope abut the defining surfaces of the portions 541 and 542, and then the valve stem is closed. The result is to condense an approximately 6-inch thickness of fiberglass leaving the remaining device mostly void of air which is a preferred condition for the prohibition of heat transfer and thereby provide a higher R-value than would be possible with urethane foam.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A sealing and insulation device for use between two spaced apart surfaces so as to seal closed the space between said surfaces and insulate the volume occupied by said device, said device comprising:
    an envelope constructed out of a flexible, resilient, gas-impermeable material and arranged so as to define a closed and evacuated interior cavity, said evacuated condition achieved by pulling a vacuum on said interior cavity;
    a mass of flexible, resilient, insulation material disposed in said interior cavity and having suitable material properties to be shrunk to a below-normal size as a result of the vacuum pulled on said interior cavity; and
    an external laminate layer of flexible, resilient insulation material disposed on the outer surface of said envelope.

2. The device of claim 1 wherein said envelope material is polyethylene and said insulation material in said interior cavity is fiberglass.

3. The device of claim 1 wherein said envelope material is polyethylene and said insulation material in said interior cavity is flexible urethane foam.

4. The device of claim 1 wherein said envelope material is polypropylene and said insulation material in said interior cavity is fiberglass.

5. The device of claim 1 wherein said envelope material is a laminate of aluminum foil and polyethylene film and said insulation material in said interior cavity is fiberglass.

6. The device of claim 1 wherein said envelope is constructed as an elongated, tubular member having a generally circular lateral cross section.

7. A sealing and insulation device for use between two spaced apart surfaces so as to seal closed the space between the said surfaces and insulate the volume occupied by said device, said device comprising:
    an envelope constructed out of a flexible, resilient, gas-impermeable material and arranged so as to define a closed interior cavity;
    a mass of flexible, resilient insulation material disposed in said interior cavity;
    an external laminate layer of flexible, resilient insulation material disposed on the outer surface of said envelope; and
    said insulation material in said interior cavity and said envelope material each being selected so as in response to a vacuum applied to said closed interior cavity the size of the insulation-filled envelope is resiliently reduced and still able to recover to its normal non-evacuated size when the envelope is opened to the atmosphere.

8. The device of claim 7 wherein said envelope material is polyethylene and said insulation material in said interior cavity is fiberglass.

9. The device of claim 7 wherein said envelope material is polyethylene and said insulation material in said interior cavity is flexible urethane foam.

10. The device of claim 7 wherein said envelope material is polypropylene and said insulation material in said interior cavity is fiberglass.

11. The device of claim 7 wherein said envelope material is a laminate of aluminum foil and polyethylene film and said insulation material in said interior cavity is fiberglass.

12. The device of claim 7 wherein said envelope is constructed as an elongated, tubular member having a generally circular lateral cross section.

13. In combination:
    a water heater having an inner tank, an outer shell and an annular space defined therebetween by the outer surface of the tank and the inner surface of the shell; and
    a sealing and insulation device disposed within the annular space and encircling at least a majority of the outer surface of the tank and comprising:
        an envelope constructed out of a flexible, resilient, gas-impermeable material and arranged so as to define a closed interior cavity;
        an external laminate layer of flexible, resilient insulation material disposed on the outer surface of said envelope; and
        a mass of flexible, resilient insulation material disposed in said interior cavity in sufficient amount for the thickness of the insulation-filled envelope prior to assembly in said annular space to exceed the radial width of the annular space, said insulation material in said interior cavity being sufficiently resilient to be reduced in volume in response to a negative pressure applied to said interior cavity such that the thickness of said envelope is less than the radial width of said clearance space when installed and said envelope expands to a condition of abutting relation against said spaced-apart surfaces when the negative pressure on said interior cavity is removed.

14. The device of claim 13 wherein said envelope material is polyethylene and said insulation material in said interior cavity is fiberglass.

15. The device of claim 13 wherein said envelope material is polyethylene and said insulation material in said interior cavity is flexible urethane foam.

16. The device of claim 13 wherein said envelope material is polypropylene and said insulation material in said interior cavity is fiberglass.

17. The device of claim 13 wherein said envelope material is a laminate of aluminum foil and polyethylene film and said insulation material in said interior cavity is fiberglass.

18. The device of claim 13 wherein said envelope is constructed as an elongated, tubular member having a generally circular lateral cross section.

* * * * *